(12) United States Patent
Zouzal et al.

(10) Patent No.: US 9,896,002 B2
(45) Date of Patent: Feb. 20, 2018

(54) VEHICLE SEAT ASSEMBLY AND METHOD OF OCCUPANT ACCOMMODATION

(71) Applicants: Lear Corporation, Southfield, MI (US); Winsen C. Zouzal, Detroit, MI (US)

(72) Inventors: Winsen C. Zouzal, Detroit, MI (US); Gerald Patrick, Shelby Township, MI (US)

(73) Assignee: LEAR CORPORATION, Southfield, MI (US)

( * ) Notice: Subject to any disclaimer, the term of this patent is extended or adjusted under 35 U.S.C. 154(b) by 9 days.

(21) Appl. No.: 15/085,460

(22) Filed: Mar. 30, 2016

(65) Prior Publication Data

US 2017/0282753 A1   Oct. 5, 2017

(51) Int. Cl.
*B60N 2/30* (2006.01)
*B60N 2/02* (2006.01)
*B60N 2/00* (2006.01)
*B60N 2/01* (2006.01)
*B60N 2/06* (2006.01)
*G06F 19/00* (2011.01)

(52) U.S. Cl.
CPC .......... *B60N 2/0244* (2013.01); *B60N 2/002* (2013.01); *B60N 2/01* (2013.01); *B60N 2/06* (2013.01); *B60N 2002/0268* (2013.01)

(58) Field of Classification Search
CPC ... B60N 2/30; B60N 2/48; B60N 2/20; B60N 2/4832; B60N 2/4829
USPC ........................................................ 701/49
See application file for complete search history.

(56) References Cited

U.S. PATENT DOCUMENTS

| | | | |
|---|---|---|---|
| 5,812,399 A | 9/1998 | Judic et al. | |
| 5,882,060 A | 3/1999 | Walk et al. | |
| 7,669,909 B2 | 3/2010 | Reinhardt et al. | |
| 8,616,654 B2 | 12/2013 | Zenk et al. | |
| 8,958,955 B2 | 2/2015 | Hotary et al. | |
| 9,145,078 B2 | 9/2015 | Locke et al. | |
| 2003/0090133 A1* | 5/2003 | Nathan ................ | B60N 2/002 297/217.3 |

(Continued)

FOREIGN PATENT DOCUMENTS

| | | |
|---|---|---|
| DE | 4409046 A1 | 9/1995 |
| DE | 10312119 A1 | 10/2003 |

(Continued)

OTHER PUBLICATIONS

Office Action from German Application No. DE 102017200064.3; dated Jul. 19, 2017; 11 pages.

*Primary Examiner* — Tan Q Nguyen
(74) *Attorney, Agent, or Firm* — Brooks Kushman P.C.

(57) ABSTRACT

A vehicle seating assembly is provided. The seat assembly includes a front seat assembly having a front seat bottom adapted to be mounted to the vehicle body and a front seat back adapted to be mounted to the vehicle body adjacent to the front seat bottom. A sensor cooperates with at least one of the front seat bottom and the front seat back. An actuator is disposed on at least one of the seat bottom and seat back. The seat assembly includes a rear seat assembly behind the front seat assembly. A vehicle seat controller receives an input indicative of a rear occupant seated information and convey a signal to an actuator to move a front seat assembly to an accommodation position in response to the input.

18 Claims, 1 Drawing Sheet

(56) References Cited

U.S. PATENT DOCUMENTS

| | | | |
|---|---|---|---|
| 2011/0062737 A1* | 3/2011 | Kroener | B60N 2/0232 296/65.08 |
| 2014/0152041 A1* | 6/2014 | Woodhouse | B60N 2/01 296/64 |
| 2015/0084985 A1* | 3/2015 | Baudu | B60N 2/0244 345/629 |
| 2015/0145296 A1* | 5/2015 | Hotary | B60N 2/0228 297/217.1 |
| 2015/0145300 A1* | 5/2015 | Finlay | B64D 11/0696 297/257 |
| 2016/0280098 A1 | 9/2016 | Frye et al. | |
| 2016/0280161 A1 | 9/2016 | Lippman et al. | |
| 2016/0288669 A1 | 10/2016 | Woodhouse et al. | |
| 2016/0332539 A1* | 11/2016 | Rawlinson | B60N 2/0244 |

FOREIGN PATENT DOCUMENTS

| | | |
|---|---|---|
| DE | 102009043409 A1 | 4/2010 |
| DE | 102010062317 A1 | 6/2012 |
| DE | 102012208644 A1 | 5/2013 |
| DE | 102013012388 A1 | 1/2015 |
| DE | 102014209250 A1 | 4/2015 |
| DE | 102016105713 A1 | 9/2016 |
| DE | 10201614907 A1 | 10/2016 |
| FR | 2988654 A1 | 10/2013 |

* cited by examiner

VEHICLE SEAT ASSEMBLY AND METHOD OF OCCUPANT ACCOMMODATION

TECHNICAL FIELD

Various embodiments relate to adjustable seat assemblies.

BACKGROUND

An adjustable seat assembly is illustrated and described in U.S. Pat. No. 9,145,078, which issued on Sep. 29, 2015 to Lear Corporation.

SUMMARY

According to at least one embodiment, a vehicle seat controller is provided. The seat controller is programmed to receive a first input indicating a position of a front seat and receive a second input indicating an occupant's physical characteristic in a rear seat. Based on the first input, the controller determines a current occupant space. Based on the second input, the controller determines a recommended occupant space. When the recommended occupant space is less than the current occupant space, the controller provides a signal to an actuator to move the front seat to an accommodation position.

According to another embodiment, a vehicle seating assembly is provided. The seat assembly includes a front seat assembly having a front seat bottom adapted to be mounted to the vehicle body and a front seat back adapted to be mounted to the vehicle body adjacent to the front seat bottom. A sensor cooperates with at least one of the front seat bottom and the front seat back. An actuator is disposed on at least one of the seat bottom and seat back. The seat assembly includes a rear seat assembly behind the front seat assembly. A vehicle seat controller receives an input indicative of a rear occupant seated information and convey a signal to an actuator to move a front seat assembly to an accommodation position in response to the input.

According to a further embodiment, the accommodation position decreases at least one of a relined angle of the front seat back and a fore-aft position of the front seat bottom to increase the recommended rear occupant space.

According to yet another embodiment, the accommodation position is further defined as a reclined orientation of the seat back.

According to still another embodiment, the accommodation position is further defined as a fore-aft orientation of the seat bottom.

According to another embodiment, the seat assembly includes an interface in communication with the controller for inputting the occupant's height.

According to one other embodiment, a method for controlling a seat assembly is provided. The seat assembly includes a front seat and a rear seat positioned rearward of the front seat. The method includes receiving a first input indicating rear occupant information of the rear seat. A signal is provided to an actuator to move the front seat to an accommodation position in response to the first input.

According to another embodiment, the method includes receiving a second input indicating a position of the front seat. A recommended occupant space is determined based on the second input. A current occupant space is determined based on the second input. The signal is provided to the actuator to move the front seat to the accommodation position when the recommended occupant space is less than the current occupant space.

According to a further embodiment, the method includes moving the front seat to the accommodation position by decreasing at least one of a relined angle of a front seat back and a fore-aft position of a front seat bottom to increase the recommended occupant space.

According to another embodiment, the method includes receiving the first input via a user interface.

According to yet another embodiment, the method includes notifying a front seat occupant before moving the front seat to the accommodation position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
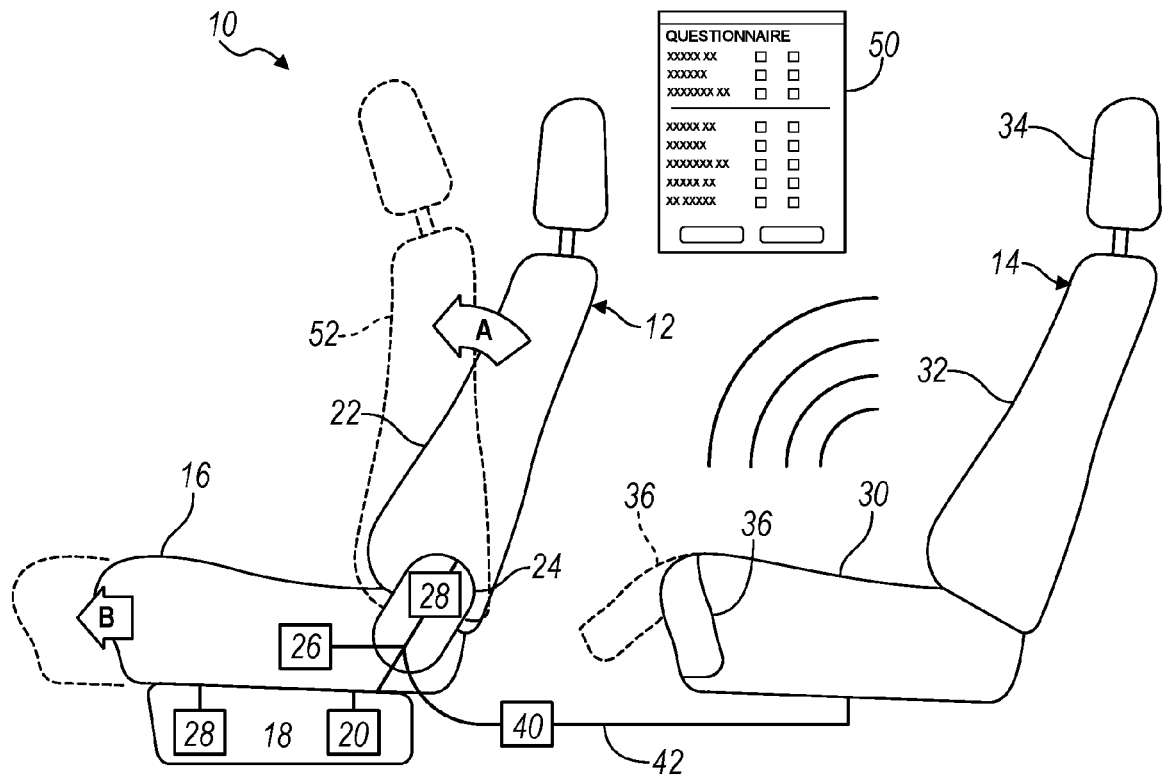
FIG. 1 is a schematic illustration of a vehicle seat assembly according to an embodiment, illustrated in an upright position and a stow position.

Referring now to FIG. 1, a vehicle seat assembly is illustrated according to an embodiment and is reference generally by numeral 10. The vehicle seat assembly 10 is adapted to be mounted to a vehicle body, as is known in the art. The vehicle seat assembly 10 may be installed in any vehicle, for example a land vehicle, such as an automobile. The vehicle seat assembly 10 includes a front seat 12 and a rear seat 14 positioned rearward of the front seat 12, both adapted to be mounted to a vehicle body. The front and rear seats 12, 14 may be a driver's side seat or a passenger side seat.

The first row seat 12 includes a seat bottom 16 that is adapted to be adjustably mounted in the vehicle along a seating rail or frame 18. The seat bottom 16 and frame 18 may include mounting hardware with fore/aft adjustment, as is known in the art. As such, the seat bottom 16 may be translated along arrow B in the fore-aft direction. An actuator 20 is provided for moving the seat bottom 16 in the fore-aft direction.

The front seat 12 also includes a seat back 22 which is adapted to be pivotally connected to the vehicle body adjacent to the seat bottom 16, as is known in the art. The seat back 22 may be pivotally connected to the seat bottom 16 by a recline mechanism 24, which is also known in the art. Alternatively, the seat back 22 could be pivotally connected to the vehicle body via the recline mechanism 24. For example, the seat back 22 may be pivoted in the direction of arrow A. The seat back 22 is pivotally adjustable to at least two positions, an upright or reclined position depicted position, where the seat back 22 is pivoted rearward of the upright position at a reclined angle. Of course, the seat back 22 may be positioned in multiple reclined positions at various reclined angles rearward of the upright position based on the occupant's preferred seated position. The seat back 22 may also be pivoted forward of the upright position to a non-use position, or stowed position. An actuator 26 is provided for pivoting the seat back 22 to the various reclined angles.

The front seat 12 may also be provided with sensors 28 to detect the seat position. The sensors 28 may be provided on the front seat bottom 16 for detecting the fore-aft position of the seat bottom 16. A sensor 28 can also be provided on the seat back 22 for detecting the reclined position of the seat back 22.

The seating assembly 10 also includes the rear seat 14. As shown in FIG. 1, the rear seat 14 is a second row seat, but the seat assembly 10 may have any number of rows. The rear seat 14 includes a seat bottom 30 adapted to be operably connected to a vehicle body for adjustment to between at least an upright and a stored position. The rear seat 14 also includes a seat back 32 operably connected to the vehicle body adjacent to the seat bottom 30 for adjustment to an upright position and a stored position. A head restraint 34 is supported upon the seat back 32. The head restraint 34 may be mounted to a pair of posts extending from the seat back 32 for supporting the head restraint 34, and optionally providing height adjustment. The head restraint 34 is also pivotally connected to the seat back 32 for stowing or folding the head restraint 34 when not in use. The rear seat 14 may also include a deployable foot rest 36 that can extend forward to support the lower legs of the occupant.

A vehicle seat controller 40 may also be provided in the seat assembly 10, such as in the front seat 12. Alternatively, the controller 40 may be provided as a kernel in a vehicle controller. The controller 40 is in communication with the sensors 28 and the seat bottom actuator 20 the seat back actuator 26. The sensors 28 and actuators 20, 26 are connected to a wire harness 42 for conveying communication signals from the controller 40 and the front seat 12 or rear seat 14, or vice versa.

An interface 50 is also provided with the seat assembly 10. The interface 50 may be integrated into the vehicle, such as an instrument panel display. The interface 50 may be remote, such as a personal digital assistant (PDA) including phones, tablets and the like. The interface 50 may be provided as a smart phone application, wherein users enter relevant information or physical characteristics about themselves. The smart phone interface may not require on-site expertise or seat properties. The remote interface permits a user to transport settings to each vehicle, such as personal passenger vehicles, airline seating, rental cars, and the like. The interface 50 may be wired or wireless communication with the controller 40.

Figure 2:
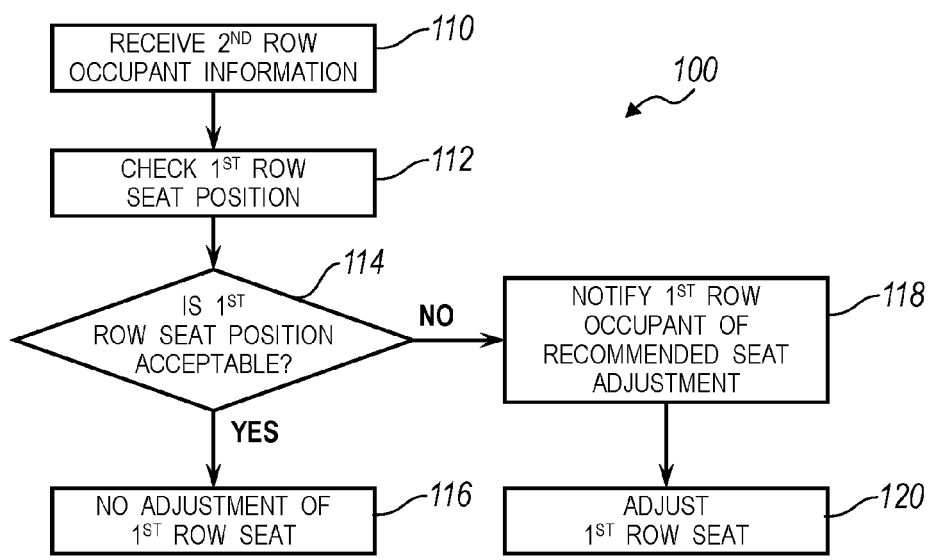
FIG. 2 is a flow chart illustration of a method of controlling the vehicle seat assembly of FIG. 1.

FIG. 2 illustrates a method 100 of controlling the seat assembly 10. In block 110, the controller 40 receives information regarding the rear occupant who is seated, or will be seated, in the rear seat 14. The occupant information includes the rear occupant's height and the rear occupant's weight, for example. The occupant may also provide information about physical characteristics, such as their leg length, thigh length or inseam length, for example. The occupant information may input via the interface 50. Alternatively, the rear occupant information may be provided to the controller 40 from sensors disposed in or adjacent to the rear seat 14 that sense the occupant information such as height and weight. Based on the rear occupant data input, the controller 40 may determine the amount of occupant space, or leg room, required by the rear occupant. The controller 40 may also receive information about the occupant's intent to adjust the rear seat 14, such as deploying the foot rest 36 to support the occupant's lower legs.

In block 112, the controller 40 determines the position of the front seat 12. The controller 40 receives inputs from the sensors 28 indicating the angle of recline rearward of the seat back 22 and the fore-aft position of the seat bottom 16. Based on position of the front seat 12, including the recline angle of the seat back 22 and fore-aft position of the seat bottom 16, the controller 40 may determine the amount of occupant space, or leg room, provided for the rear passenger.

In step 114, the controller 40 determines if the position of the front seat 12 is acceptable based on the rear occupant information. The controller 40 compares the recommended occupant space to the currently provided occupant space. If the currently provided occupant space is greater than the recommended occupant space, no adjustment of the front seat 12 needed, as indicated in block 116. But if the currently provided occupant space is less than the recommended occupant space, the front seat 12 may be automatically adjusted to an accommodation position.

Prior to adjusting the front seat 12, the controller 40 notifies the occupants of the recommended seat adjustment via the interface 50, as shown in block 118. The occupants may decline or accept the recommended seat adjustment via the interface 50. The controller 40 may also receive input that the front seat is occupied via a vehicle seat occupancy switch or front occupant data input via the interface 50. The controller 40 may prevent actuation of the seat 12 to the accommodation position when the front seat 12 is occupied by a passenger. The controller 40 may also ensure that the vehicle is parked or not moving before initiating the recommended seat adjustment to the accommodation position.

In block 120, the front seat 12 is adjusted to provide adequate occupant space or leg room for the rear seat 14. The controller 40 conveys a signal to the actuators 20, 26 with instructions to move the seat to the accommodation position 52. To move the seat to the accommodation position, the controller 40 conveys a signal to the actuators 20, 26 to pivot the seat back 22 forward in a direction of arrow A and/or to move the seat 12 in the fore-aft direction along arrow B.

The various seat assembly controllers from the various embodiments may be embodied in a module within the corresponding seat assembly, or any controller; each of which may generally include any number of microprocessors, ASICs, ICs, memory (e.g., FLASH, ROM, RAM, EPROM, and/or EEPROM) which co-act with software code to perform the operations.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat controller programmed to:
   receive a first input indicating a position of a front seat;
   receive a second input indicating an occupant's physical characteristic in a rear seat;
   determine a current rear-occupant space based on the first input;
   determine a recommended rear-occupant space based on the second input;

provide a signal to an actuator to move the front seat to an accommodation position when the current rear-occupant space is less than the recommended rear-occupant space, wherein the accommodation position adjusts at least one of a relined angle of a front seat back and a fore-aft position of a front seat bottom to increase the current rear-occupant space.

2. A vehicle seating assembly comprising:
a front seat assembly comprising:
   a front seat bottom adapted to be mounted to the vehicle body;
   a front seat back adapted to be mounted to the vehicle body adjacent to the front seat bottom;
   a sensor cooperating with at least one of the front seat bottom and the front seat back;
      an actuator disposed on at least one of the seat bottom and seat back; and
   a rear seat assembly behind the front seat assembly; and
a vehicle seat controller according to claim 1 in communication with the sensor and the actuator.

3. The vehicle seat controller of claim 1 wherein the controller is further programmed to:
   notify a front seat occupant before moving the front seat to the accommodation position.

4. The vehicle seat controller of claim 1 wherein the controller is further programmed to:
   receive a third input indicating whether the front seat is occupied; and
   provide a signal to an actuator to move the front seat to the accommodation position if the front seat is not occupied.

5. The vehicle seat assembly of claim 2 wherein said physical characteristic comprises the occupant's height, and where the vehicle seat assembly further comprises an interface in communication with the controller for inputting the height.

6. A vehicle seat controller programmed to:
   receive an input indicative of a rear occupant seated information; and
   convey a signal to an actuator to move a front seat assembly to an accommodation position in response to the input; and
   notify a front seat occupant before moving the front seat to the accommodation position.

7. A vehicle seating assembly comprising:
a front seat assembly comprising:
   a front seat bottom;
   a front seat back mounted adjacent to the front seat bottom;
   a sensor cooperating with at least one of the front seat bottom and the front seat back;
      an actuator disposed on at least one of the seat bottom and seat back; and
a rear seat assembly behind the front seat assembly;
a vehicle seat controller according to claim 6 in communication with the sensor and the actuator.

8. The vehicle seat assembly of claim 7 wherein the accommodation position is further defined as a reclined position of the front seat back.

9. The vehicle seat assembly of claim 7 wherein the accommodation position is further defined as a fore-aft position of the front seat bottom.

10. The vehicle seat assembly of claim 7 further comprising a wire harness connecting the controller and the front seat assembly.

11. The vehicle seat assembly of claim 7 wherein the rear occupant seated information includes an occupant height.

12. The vehicle seat assembly of claim 7 further comprising an interface in communication with the controller for inputting the rear occupant seated information and notifying the front seat occupant before moving the front seat.

13. The vehicle seat assembly of claim 7 wherein the rear occupant seated information includes moving a rear foot rest to a deployed position.

14. A method for controlling a seat assembly having a front seat and a rear seat positioned rearward of the front seat, the method comprising:
   receiving a first input indicating rear occupant information of the rear seat;
   receiving a second input indicating a position of the front seat;
   determining a recommended occupant space based on the second input;
   determining a current occupant space based on the second input; and
   providing a signal to an actuator to move the front seat to an accommodation position in response to the first input, wherein the signal is provided to the actuator to move the front seat to the accommodation position when the current occupant space is less than the recommended occupant space;
   moving the front seat to the accommodation position by adjusting at least one of a relined angle of a front seat back and a fore-aft position of a front seat bottom to increase the current occupant space.

15. The method of claim 14 further comprising:
   receiving a third input indicating whether the front seat is occupied; and
   providing a signal to an actuator to move the front seat to the accommodation position if the front seat is not occupied.

16. The method of claim 14 further comprising receiving the first input via a user interface.

17. The method of claim 14 further comprising notifying a front seat occupant before moving the front seat to the accommodation position.

18. The method of claim 14 wherein the rear occupant information comprises a rear occupant height.

* * * * *